(12) United States Patent
Friedemann et al.

(10) Patent No.: US 8,622,067 B2
(45) Date of Patent: Jan. 7, 2014

(54) SEPARATOR ARRANGEMENT AND METHOD FOR GAS BY-PASS OF A LIQUID PUMP IN A PRODUCTION SYSTEM

(75) Inventors: John Daniel Friedemann, Gjettum (NO); Bjørn Erik Kvilesjø, Vettre (NO)

(73) Assignee: Vetco Gray Scandinavia AS, Sandvika (NO)

( * ) Notice: Subject to any disclaimer, the term of this patent is extended or adjusted under 35 U.S.C. 154(b) by 268 days.

(21) Appl. No.: 13/126,232

(22) PCT Filed: Oct. 26, 2009

(86) PCT No.: PCT/IB2009/007225
§ 371 (c)(1),
(2), (4) Date: Jun. 27, 2011

(87) PCT Pub. No.: WO2010/049781
PCT Pub. Date: May 6, 2010

(65) Prior Publication Data
US 2011/0259430 A1    Oct. 27, 2011

(30) Foreign Application Priority Data
Oct. 27, 2008  (NO) .................................. 20084507

(51) Int. Cl.
*F15D 1/00*    (2006.01)
(52) U.S. Cl.
USPC ........... 137/1; 137/240; 137/565.01; 137/587
(58) Field of Classification Search
USPC .................................. 137/240, 587, 565.01, 1
See application file for complete search history.

(56) References Cited

U.S. PATENT DOCUMENTS

| 3,593,744 | A | * | 7/1971 | Smith ...................... 137/565.01 |
| 4,095,920 | A | * | 6/1978 | Needham et al. ............. 137/240 |
| 4,310,335 | A |   | 1/1982 | Arnaudeau |
| 5,377,714 | A |   | 1/1995 | Giannesini et al. |
| 6,162,021 | A |   | 12/2000 | Sarshar et al. |

FOREIGN PATENT DOCUMENTS

GB    2239676 A    7/1991

OTHER PUBLICATIONS

PCT/ISA/210—International Search Report—Mar. 2, 2010.
PCT/ISA/237—Written Opinion of the International Searching Authority—Mar. 2, 2010.
Norwegian Search Report—May 14, 2009.

* cited by examiner

*Primary Examiner* — Kevin Lee
(74) *Attorney, Agent, or Firm* — Venable LLP; Eric J. Franklin

(57) ABSTRACT

A separator arrangement in a multiphase production system. A closed separator container includes a top and a bottom, an inlet for production fluids at an inlet level and at least one outlet for at least partly separated liquid at a level lower than the inlet level. The container outlet is connectable to a liquid pump arranged downstream of the container. A gas accumulator is arranged for by-passing the pump. The gas accumulator includes an inlet end connectable to a top region of the container and an outlet end connectable to a discharge side of the pump for flow communication between the container and the discharge side of the pump. A region near the inlet end the gas accumulator is connected to a supply of injection liquid that is controllable via a valve to be injected to the discharge side of the pump via the gas accumulator. A method for gas by-pass of a liquid pump in a multiphase production system.

11 Claims, 2 Drawing Sheets

SEPARATOR ARRANGEMENT AND METHOD FOR GAS BY-PASS OF A LIQUID PUMP IN A PRODUCTION SYSTEM

TECHNICAL FIELD OF THE INVENTION

The present invention relates to arrangements in multiphase production systems having a low gas content, and more specifically to a separator arrangement and a method by which gas is separated from a production fluid, such as a well fluid, and re-introduced in the at least partly separated fluid on the discharge side of a liquid pump.

Application areas of the present invention are typically, but not exclusively, in an offshore plant, such as a subsea plant, or a land based facility, for extraction and/or processing of well fluid from a hydrocarbon producing well.

BACKGROUND AND PRIOR ART

Separators are widely used in hydrocarbon production and designed to separate production fluids into their constituent components of oil, gas and/or water. They work basically from the principle that the three components are of different densities which results in a stratification with gas in a top region, oil in a middle region and water in a bottom region of a separator container or tank, if the fluids are slowly passed through the separator.

The present invention is useful especially in hydrocarbon production on oil fields where there is a low gas content in the production fluids, or as part of a separation system applied in production of well fluids that normally contain no gas. In use, the present invention effects purging of gas if gas appears due to for instance out of specified operation or transients and/or due to that the system pressure is reduced. Such situation can swiftly arise in an only liquid (non-compressible) system in result of, e.g., a trapped and isolated volume being cooled down, leading to reduction in pressure and temperature followed by a gas flashing situation.

The object is to avoid free gas in the fluid that passes a liquid pump which is used to feed the production fluids, such as well fluids to a host facility. The free gas will otherwise reduce the pump performance, i.e. its ability to deliver differential pressure. Free gas may accumulate in the separator and need to be removed. A conventional gas outlet with direct flow line, such as a riser, to a host facility will not be functional in this case, based on two concerns: firstly, and because of the flow rate, the gas will be cooled down in the gas riser which may result in formation of hydrates in the gas riser, and secondly because of liquid build-up in the gas riser due to low flow velocity which may cause a liquid plug in the gas riser.

SUMMARY OF THE INVENTION

An object of the present invention is thus to avoid any free gas that is likely to be released resulting from gas dissolved in the separated liquid.

This object is achieved through the separator arrangement and method defined in the independent claims. Advantageous embodiments of the invention are defined in the dependent claims.

Briefly, a separator arrangement in a multiphase production system having a low gas content, typically lower than 1%, is provided and comprises a closed separator container having a top and a bottom, an inlet for production fluids at an inlet level and at least one outlet for at least partly separated liquid at a level lower than the inlet level. The separator container outlet is connectable to a liquid pump arranged downstream of the container. The separator is characterized by a gas accumulator by-passing the pump, the gas accumulator having an inlet end connectable to a top region or point of the container and an outlet end connectable to a discharge side of the pump for flow communication between the container and the discharge side of the pump, wherein in a region near its inlet end the gas accumulator is connected to a supply of injection liquid that is controllable via a valve to be injected to the discharge side of the pump via the gas accumulator.

In a preferred embodiment, the gas accumulator is realized as a pressure vessel comprising an isolated volume between the separator and the pump discharge which accumulator is arranged inclined from a lower inlet end to an upper outlet end.

Advantageously, a first valve upstream of the gas accumulator is operable for isolation of the gas accumulator from the container, and a second valve downstream of the gas accumulator operable for isolation of the gas accumulator from the discharge side of the pump. The first and second valves are controllable for shifting the gas accumulator between flushing and accumulation modes.

Advantageous embodiments of the invention include, e.g., a gas accumulator comprising a pipe section or a pipe length shaped into a straight pipe piece or helix configuration, or a gas accumulator comprising a number of individual pipe sections arranged in side-by-side relation. Another embodiment foresees a gas accumulator comprising a number of individual pipe sections arranged in a bundle. A manifold structure may be arranged for distributing the injection liquid to the gas accumulator.

Analogously, a method is provided for gas by-pass of a liquid pump in a multiphase production system having a low gas content, comprising the step of stratification of fluid components in a separator container from which at least partly separated liquid is transported via the pump. The method is characterized by the steps of:

arranging a gas accumulator with an inlet end in flow communication with a top region or point of the separator container and an outlet end in flow communication with a discharge side of the pump;

isolating the gas accumulator from the discharge side of the pump in accumulation mode, and extruding accumulated gas from the gas accumulator to the discharge side of the pump by injecting an injection liquid into the gas accumulator in a flushing mode.

In a preferred embodiment, the method comprises the step of injecting the liquid into the gas accumulator at a region near the inlet end of the gas accumulator. A hydraulic fluid, hydrate inhibitor or diesel, e.g., may be used as injection liquid.

DETAILED DESCRIPTION OF PREFERRED EMBODIMENTS OF THE PRESENT INVENTION

Figure 1:
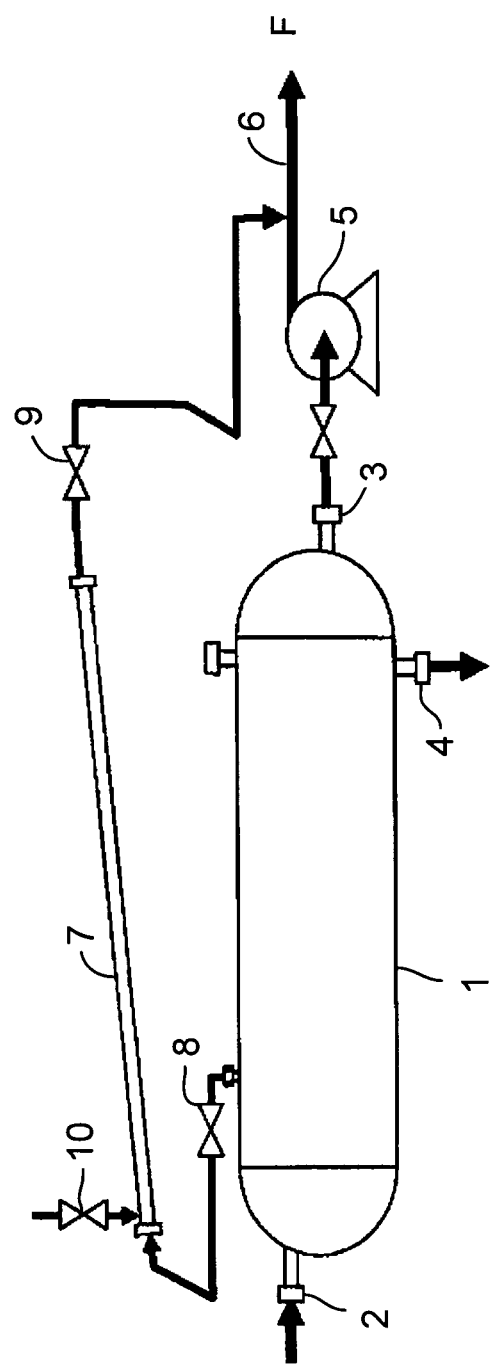
FIGS. 1-4 represent schematic drawings of embodiments of separator arrangements.

A separator arrangement and method in a multiphase production system having a low gas content, typically lower than 1%, are more closely explained below with reference to FIG. 1. Thus with reference to FIG. 1, reference number 1 denotes a separator container 1 arranged for separation or stratification of well fluids into their constituent components of typically oil, gas and water. The typically unprocessed well fluids are introduced into the container via an inlet 2 arranged at an upper level. Processed liquid, typically oil, is discharged via an outlet 3 arranged on a medium level. In a bottom of the container 1, an additional outlet 4 is arranged for discharge of production water that accumulates in a bottom region of the container 1. The outlet 3 is connected to the inlet side of a pump 5 which is driven for transport of separated liquid via a flow-line 6 on the discharge side of the pump 5. The arrow F indicates the flow direction from the system.

According to the invention, and in order to avoid free gas in the liquid pump 5, a gas accumulator 7 is arranged to by-pass the pump 5. The gas accumulator 7 is preferably realized as a pipe section as illustrated in FIG. 1. The gas accumulator 7 has an inlet end which is connectable to a top region or point of the container 1. A first valve 8 is arranged in this connection and shiftable to permit flow communication from the container to the gas accumulator in the open position of valve 8. The gas accumulator 7 further has an outlet end which is connectable to the discharge side of the pump 5. A second valve 9 is arranged in this connection and shiftable to permit flow communication with the discharge side of the pump in the open position of valve 9. Advantageously, the gas accumulator 7 is arranged inclined from a lower inlet end to an upper outlet end.

In a region near its inlet end, the gas accumulator 7 is connected to a supply of liquid via a third valve 10. The valve 10 is controllable for introducing liquid under pressure into the gas accumulator 7. The valve 10 for introducing liquid under pressure may be a control valve or an isolation valve in combination with a pump. The liquid concerned would typically be methanol or diesel, e.g., which can be injected from a supply arranged on a host facility, if appropriate.

The system is shiftable between accumulation mode and flushing mode as now will be explained. In operation, gas that develops in container 1 rises via open valve 8 into the gas accumulator 7. The rising gas is trapped in the gas accumulator by the valve 9 being shifted to the close position, thus isolating the gas accumulator 7 from the discharge side of the pump 5 in accumulation mode. At preset time intervals, or based on gas detection, valve 8 is closed this way isolating the gas accumulator 7 from the container 1. Valves 9 and 10 are then both shifted to the open position to provide flow communication with the discharge side of the pump 5 in flushing mode. The liquid under pressure then flushes through the gas accumulator to the discharge side of the pump, extruding any gas that has accumulated in the gas accumulator into the flow-line 6 downstream of the pump 5.

The system is then shifted back to accumulation mode by closing the valves 9 and 10, and shifting the valve 8 into the open position. Any liquid remaining in the gas accumulator 7 will eventually bleed through the valve 8 into the separator container 1.

Free gas volumes in the pump are thus avoided through separation and accumulation of gas upstream of the pump, and reintroduction of the gas in the production fluid downstream of the pump by means of liquid injection.

Feasible Modifications

Albeit designed as a straight pipe section in the illustrated embodiment, the gas accumulator may be realized in other configurations.

For example, in case a greater gas accumulation capacity is required the gas accumulator 7 may be designed as a helix, and may alternatively be composed from a number of individual pipes arranged in a bundle, or arranged in a side by side relation.

Figure 2:
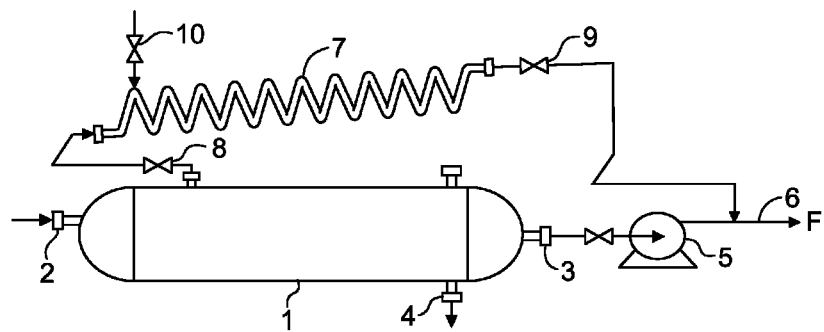
Figure 3:
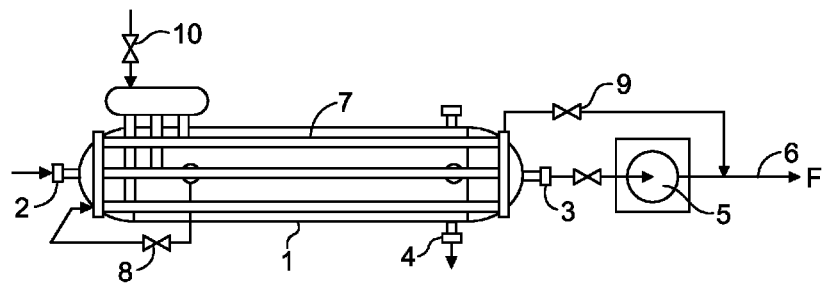
Figure 4:
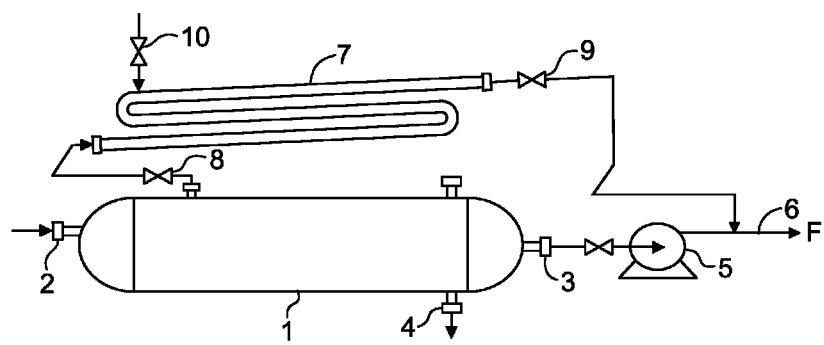

In the two latter cases, flushing liquid may be injected in the gas accumulator via a manifold structure. In either case, the gas accumulator may be vertical or near horizontal, or arranged at any inclination between the vertical and the near horizontal orientation. Further, alternative placements of valves 9 and 10 may be possible than the ones illustrated in FIG. 1, such as the embodiments illustrated in FIGS. 2-4.

The production fluids entering the separator container may be a mixture of well fluids as described above by way of example. However, it may also be any other kind of mixture of fluids that needs to be separated depending on the specific application.

The liquid pump as described above may be a single phase pump such as centrifugal pump. The term liquid pump should also be understood in a broad sense to include all kinds of liquid displaceable machines.

The present invention is defined in the appended claims, encompassing all herein mentioned modifications as well as any unmentioned modification that will be obviously conceivable for a person skilled in the art from this disclosure.

The invention claimed is:

1. A separator arrangement in a multiphase production system, comprising:
   a closed separator container having a top and a bottom, an inlet for production fluids at an inlet level and at least one outlet for at least partly separated liquid at a lower outlet level,
   a liquid pump arranged downstream of the container, wherein the container outlet is connectable to the liquid pump, and
   a gas accumulator by-passing the pump, the gas accumulator having an inlet end connectable to a top region of the container and an outlet end connectable to a discharge side of the pump for flow communication between the container and the discharge side of the pump, wherein a region of the inlet end the gas accumulator is connected to a supply of injection liquid that is controllable via a valve to be injected to the discharge side of the pump via the gas accumulator.

2. The arrangement according to claim 1, wherein the gas accumulator comprises a pressure vessel comprising an isolated volume between the separator and the pump discharge, wherein the accumulator is arranged inclined from a lower inlet end to an upper outlet end.

3. The arrangement according to claim 1, further comprising:
   a first valve arranged upstream of the gas accumulator and being operable to isolate the gas accumulator from the container, and
   a second valve arranged downstream of the gas accumulator and being operable to isolate the gas accumulator from the discharge side of the pump,
   wherein the first and second valves are controllable for shifting the gas accumulator between flushing and accumulation modes.

4. The arrangement according to claim 1, wherein the gas accumulator comprises a pipe section shaped into a straight pipe piece.

5. The arrangement according to claim 4, wherein the gas accumulator comprises a pipe section shaped into helix configuration.

6. The arrangement according to claim 1, wherein the gas accumulator comprises a number of individual pipe sections arranged in side-by-side relation.

7. The arrangement according to claim 6, wherein the gas accumulator comprises a number of individual pipe sections arranged in a bundle.

8. The arrangement according to claim 6, further comprising:

a manifold structure configured to distribute the injection liquid to the gas accumulator.

9. A method for gas by-pass of a liquid pump in a multiphase production system, comprising stratifying fluid components in a separator container from which at least partly separated liquid is transported via the pump, the method comprising:

arranging a gas accumulator with an inlet end in flow communication with a top region of the separator container and an outlet end in flow communication with a discharge side of the pump;

isolating the gas accumulator from the discharge side of the pump in an accumulation mode, and extruding accumulated gas from the gas accumulator to the discharge side of the pump by injecting an injection liquid into the gas accumulator in a flushing mode.

10. The method according to claim 9, further comprising:

injecting the liquid into the gas accumulator at a region of the inlet end of the gas accumulator.

11. The method according to claim 10, wherein at least one of a hydraulic fluid, a hydrate inhibitor or diesel is used as injection liquid.

\* \* \* \* \*